(12) United States Patent
Beutlhauser

(10) Patent No.: US 6,987,809 B1
(45) Date of Patent: Jan. 17, 2006

(54) METHOD FOR SEPARATING IMAGE SEQUENCES STORED ON SUPPORTS SUCH AS MOTION-PICTURE FILM, VIDEO TAPE OR SUCH LIKE

(75) Inventor: Roland Beutlhauser, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 09/857,715

(22) PCT Filed: Dec. 10, 1999

(86) PCT No.: PCT/DE99/04028

§ 371 (c)(1),
(2), (4) Date: Jun. 8, 2001

(87) PCT Pub. No.: WO00/34953

PCT Pub. Date: Jun. 15, 2000

(51) Int. Cl.
H04B 1/66 (2006.01)

(52) U.S. Cl. .................... 375/240.13; 348/700

(58) Field of Classification Search ............ 348/699, 348/700; 382/232, 234, 236, 103; 395/157; 437/31; 375/240.13; H04B 1/66
See application file for complete search history.

(56) References Cited

U.S. PATENT DOCUMENTS 5,083,860 A * 1/1992 Miyatake et al. ........... 352/129
5,493,345 A * 2/1996 Ishikawa et al. ............ 348/700
5,537,530 A 7/1996 Edgar et al. ................ 395/157
5,593,905 A 1/1997 Johnson et al. ............... 437/31
5,642,294 A * 6/1997 Taniguchi et al. .......... 348/700
5,828,786 A 10/1998 Rao et al. .................... 382/236
5,835,163 A 11/1998 Liou et al. .................. 348/700
5,937,079 A * 8/1999 Franke ........................ 382/103
6,157,744 A * 12/2000 Nagasaka et al. ........... 382/236

FOREIGN PATENT DOCUMENTS

| EP | 0 729 117 | 8/1996 |
| EP | 0 780 776 | 6/1997 |
| WO | WO 98/34182 | 8/1998 |

OTHER PUBLICATIONS

English translation of International Preliminary Examination Report for International Application No. PCT/DE99/04028.

* cited by examiner

*Primary Examiner*—Tung Vo

(74) *Attorney, Agent, or Firm*—Christie, Parker and Hale, LLP

(57) ABSTRACT

The invention relates to a method for separating successive image sequences of motion-picture films, video tapes or the like into individual sequences. According to said method, sequence changes of a first type, which are based on a change in the mean brightness of successive images, and/or sequence changes of a second type, which are based on a change in the content of successive images, are detected and separation markers for the automatic separation of the image sequences into individual sequences are set.

23 Claims, 1 Drawing Sheet

METHOD FOR SEPARATING IMAGE SEQUENCES STORED ON SUPPORTS SUCH AS MOTION-PICTURE FILM, VIDEO TAPE OR SUCH LIKE

CROSS-REFERENCED TO RELATED APPLICATION

This application claims priority of International application number PCT/DE99/04028, filed Dec. 10, 1999, which in turn claims priority to German patent application number 198 59 087.3, filed Dec. 10, 1998.

FIELD OF THE INVENTION

The invention relates to a method for separating image sequences, stored on media such as motion-picture films, video tapes or the like, into individual sequences.

BACKGROUND OF THE INVENTION

It is known to manually split successive scenes of a motion-picture film or video tape into individual sequences in order to then compile, discard or store the individual sequences, if appropriate, in a different order. In this case, the beginning of an individual sequence is usually initiated by an individual start image or a plurality of start images, for example by the recording of a film clapperboard with the assignment noted thereon.

The image sequences may be contained on various recording media, such as motion-picture films, video tapes, or electronic storage media, such as CDs or the like. In many applications, recording is effected in parallel on a motion-picture film and an electronic storage medium, the electronically stored image sequence being reflected out of an optical beam path of a motion-picture camera and being converted by means of a video chip or a video camera into video signals which are stored on the electronic storage medium.

U.S. Pat. No. 5,537,530 discloses a method for separating image sequences stored on video tapes into individual sequences, in which sequence changes of a first type which are based on a change in the mean brightness of successive images which exceed or fall below a predetermined amount and also sequence changes of a second type which are based on a change in the image content of successive images are detected and separation markers for the automatic separation of the image sequences into individual sequences are set.

In numerous applications, automatic separation of, in particular, digitized films into individual sequences is desirable, without the need for manual separation or the recording of start images for introducing an individual sequence. In the medical field, in particular, such automatic separation of digitized films into individual sequences is desirable in order that, directly after recording of the image sequences, individual sequences are made available for diagnosis. In this case, what is crucially important is that first, no images are lost during the automatic separation, and that second, a high identification rate is achieved for resolving the image sequence into individual sequences.

SUMMARY OF THE INVENTION

The present invention provides a method for automatic separation of image sequences, in particular of digitized motion-picture films, video recordings or the like, which guarantees a highest possible identification rate of the individual sequences and ensures that no images are lost during application of the separation method.

The solution according to the invention first maximizes an identification rate of the individual sequences and second maximizes the retention of all the images of the image sequences of a motion-picture film, video tape or the like.

The solution according to the invention is suitable, in particular, for realization in a data processing device with corresponding hardware components and can be used both for stand-alone applications and in network systems and also for remote data transmissions.

In one practical application, it is advantageous to display a selected individual image, preferably the first individual image in each individual sequence, as an icon on a monitor, so that a relevant individual sequence can be started by clicking on the icon. A sequence of individual sequences can be started for viewing by successively clicking on a plurality of such icons.

BRIEF DESCRIPTION OF THE DRAWINGS

The exemplary embodiments of the present invention will be better understood by reference to the following detailed description when considered in conjunction with the accompanying drawings wherein.

DETAILED DESCRIPTION OF THE INVENTION

Figure 1:
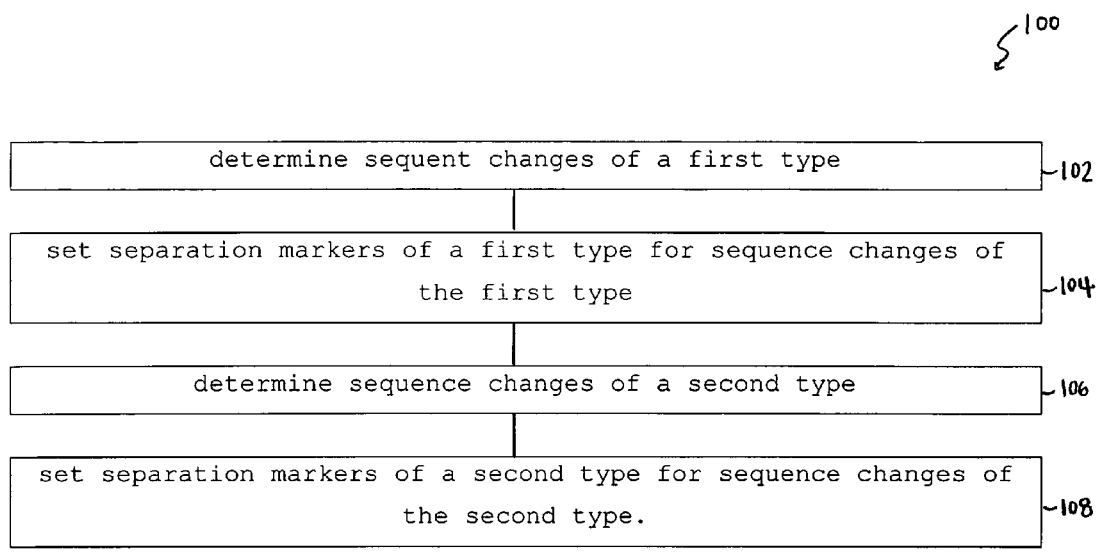
FIG. 1 is a block diagram illustrating a method for separating image sequences stored on media into individual sequences according to an exemplary embodiment of the invention.

The concept underlying the invention will be explained in more detail below using an exemplary embodiment.

For the application of the method according to the invention and of the software derived therefrom for automatically separating digitized cardiological films into individual sequences, 35 mm motion-picture films and S-VHS video tapes are used as media in the exemplary embodiment. A total of three types of sequence changes can be observed on these media:

1. On 35 mm motion-picture film (negative) two to three virtually white images, often up to three such sequence changes at short intervals (approximately three images) one after the other;
2. On video tape up to 30 virtually black images;
3. On video tape, at the end of the sequence, 10 to 15 disregarding noise—identical individual images, then start of the next sequence without specially marked intermediate images.

The first two sequence changes (1 and 2 above) are designated below as sequence changes of the first type, and the third sequence change (3 above) is designated below as a sequence change of the second type. The sequence changes of the first and second types are handled as follows:

Sequence changes of the first type, which are based on a great change in the mean brightness, can be identified very reliably, i.e. with good image material it is possible to achieve an identification rate of 100%.

Separation of image sequences is effected by setting separation markers of first and second types or sequence changes of the first and second types. A separation marker of the first type is a predetermined number of successive black or white images. The images identified as separation markers are themselves not stored. The first image after the separation marker is also the first image of the next sequence. The sequences themselves must contain at least a predetermined number of images, otherwise they are discarded.

Sequence changes of the second type, which are based on a change in the image content, are significantly more difficult to identify than sequence changes of the first type since the size of the change varies and large deviations between successive images can occur even within a sequence. In many applications, an identification rate of only approximately 75% is achieved for sequence changes of the second type, i.e. not all sequence changes are identified as such and occasionally separation is performed within a sequence. However, even if this occurs, it is guaranteed that no images are lost.

The separation is effected according to the following rules:

a) A separation marker of the second type is an image whose content differs greatly from the contents of its preceding images;
b) Separation markers of the first type always have priority over separation markers of the second type;
c) Separation markers of the second type that are situated within a predetermined number of images from separation markers of the first type are not taken into account;
d) A separation marker of the second type is not taken into account if its preceding sequence does not contain at least a predetermined number of images;
e) An image identified as a separation marker is the first image of the next sequence.

To set the behavior of the automatic separation method, the most important parameters—specified below—and also the following file names are set or specified in a file "splitter.ini":

a) The parameter MeanMinFrames specifies the minimum number of images that must be contained in the individual sequences that are terminated by separation markers of the first type. Sequences that have less than the minimum number of images are discarded. Since many films only contain very short sequences with the insertion of the patient's name (clapperboard), given an internal predetermined value of 12 and a range of values>0, a range of values for this parameter of 4 to 6 is recommended.
b) The parameter MeanSpltFrames specifies the minimum number of images that a separation marker of the first type must comprise in order that separation is performed. This predetermined value is 2, the range of values is >0.
c) The parameter MeanSensitivity indicates the response sensitivity for separation markers of the first type from low to high with a range of values from 0.0 to 1.0. The value 0.0 denotes no checking for this criterion. In order that the beginning of a new sequence whose brightness differs greatly from that of the preceding sequence can be reliably identified, this value must not, however, be too high. Within the range of values specified above, a range of values from 0.25 to 0.35 is recommended.
d) The parameter ChangeMinFrames specifies the minimum number of individual images that must be contained in sequences that are terminated by separation markers of the second type. When a sequence has less than the minimum number of individual images, the separation marker is discarded. Moreover, all separation markers of the second type are discarded which do not have at least this minimum number of individual images from separation markers of the first type. Preferably, this predetermined value is 12 given a range of values of >0.
e) The parameter ChangeSensitivity indicates the response sensitivity for separation markers of the second type. Given a range of values from 0.0 to 1.0, where the value 0.0 denotes no checking for this criterion, the value 0.7 is recommended for average video material.
f) The file SpItDatpath ("splitmarks.dat") indicates the file into which a list of separation markers is written. It is preferably valid only for a debug version of the program.
g) The file SeqDatPath ("sequences.dat") denotes the file in which the sequence list is stored unless a different file name was specified on the command line.

The automatic sequence separation can be activated separately for each video source in a set up window of a recording software. It is effected after the storage of the raw data on a hard disk and prior to further processing to form DICOM data records. In this case, the processing speed is approximately 500 to 1000 images per second. The complete path name of the program "splitter.exe" is entered as a parameter in the file VIM. IM of the recording software.

In a standard installation directory for the files "splitter.exe" and "splitter.ini", the following files are generated in accordance with the presetting:

1. A logging file "splitter.log";
2. A list of the separation markers "splitmarks.dat" for a debug version;
3. A list of the individual sequences "sequences.dat".

In order to form the algorithm, each image is firstly examined with regard to separation markers of the first type. If no such marker is found, a search is made for separation markers of the second type. Once a provisional list for the possible separation markers has been created in this way, post-processing is effected in order to determine the individual sequences.

The function CheckSplitMean is used to find the separation markers of the first type. A moving mean value (MeanMean) of the image brightnesses is calculated in each case over the last 16 (MEANFRAMES) images. From said mean value and the parameter mean sensitivity, a lower (LThresh) and upper (UThresh) threshold value are determined as follows:

$$UThresh = MeanSensitivity * MeanMean$$

$$UThresh = 255 - MeanSensitivity * (255 - MeanMean)$$

If the mean value of the current image exceeds UThresh, then a white separation marker (SPLT_WHITE) is set, and if the mean value of the current image is less than LThresh, then a black separation marker (SPLT_BLACK) is set. In this case, the mean values of the separation marker images do not enter into the moving average.

The function CheckSplitChange is used to find separation markers of the second type by calculation of the RMS deviation (CurrRmsDiff)of the pixel brightnesses between the current image and the preceding image. A moving mean value (MeanRmsDiff) of the RMS deviations is determined over the last 16 (MEANFRAMES) image changes and from this and from the parameter ChangeSensitivity a threshold value (DiffThresh) is determined as follows:

$$DiffThresh = (8 - 6 * ChangeSensitivity) * MeanRmsDiff$$

If the RMS deviation of the current image change exceeds the threshold value, then a separation marker (SPLT_CHANGE) is set. RMS deviations of separation markers of the second type enter into the moving mean value, but those of the first type do not.

The function EvaluateSplit is used to determine the individual sequences from the separation marker list with the following proviso:

1. All separation marker sequences of the first type which are shorter than the number MeanSpltFrames of images are discarded.
2. All separation markers of the second type which lie nearer to the remaining separation markers of the first type than ChangeMinFrames images are discarded.

The individual sequences thus formed start
1. with the first image in the file; or
2. with the first image after a separation marker of the first type; or
3. with a separation marker of the second type3; and end
1. with the last image in the file or
2. with the last image before a separation marker of the first type, if it is at least MeanMinFrames images long, otherwise the sequence is discarded, or
3. with the last image before a separation marker of the second type, if it is at least ChangeMinFrames images long. Otherwise, the separation marker is discarded. FIG. 1 is a block diagram illustrating a exemplary method 100 for separating image sequences stored on media into individual sequences according to an exemplary embodiment of the invention. As shown, the exemplary method 100 includes determining sequence changes of a first type 102 and setting separation markers of a first type 104 for sequence changes of the first type. In an exemplary embodiment, a sequence change of the first type is determined when a mean image brightness of a current image exceeds an upper threshold value or is less than a lower threshold value. In this embodiment, the threshold values are calculated from a moving mean value of the image brightnesses of preceding images. In one embodiment, the moving mean value is calculated based on the preceding sixteen images, although in other embodiments, any appropriate number of images may be used in the calculation of the moving mean value.

The method 100 also includes determining sequence changes of a second type 106 and setting separation markers of a second type 108 for sequence changes of the second type. In an exemplary embodiment, a sequence change of the second type is determined based on a change in an image content between successive images.

What is claimed is:

1. A method for separating image sequences stored on media into individual sequences comprising:
    determining sequence changes of a first type when a mean image brightness of a current image exceeds an upper threshold value or is less than a lower threshold value, wherein the threshold values are calculated from a moving mean value of the image brightnesses of preceding images;
    setting separation markers of a first type for sequence changes of the first type;
    determining sequence changes of a second type, based on a change in an image content between successive images; and
    setting separation markers of a second type for sequence changes of the second type.

2. The method according to claim 1, wherein the sequence changes of the first type comprise a predetermined number of successive individual images of substantially the same brightness.

3. The method according to claim 1, wherein the sequence changes of the second type comprise a predetermined number of individual images having a substantially corresponding image content.

4. The method according to claim 3, wherein the sequence changes of the second type comprise an individual image whose content differs from the content of its preceding images by a predetermined amount.

5. The method according to claim 1, wherein the image sequences are digitized before determining the sequence changes of the first and second types.

6. The method according to claim 1, further comprising examining the image sequences for separation markers of the first type and, in the absence of separation markers of the first type, examining for separation markers of the second type.

7. The method according to claim 6, further comprising producing a provisional list of all possible separation markers, and effecting a post-processing in order to determine the individual sequences.

8. The method according to claim 7, wherein separation markers of the first type take priority over separation markers of the second type.

9. The method according to claim 7, wherein separation markers of the second type which are situated within a predetermined number of individual images from separation markers of the first type are discarded.

10. The method according to claim 7, wherein a separation marker of the second type is discarded if its preceding image sequence does not contain a predetermined number of individual images.

11. The method according to claim 1, wherein separation markers that are based on image sequences that have less than a predetermined number of individual images are discarded.

12. The method according to claim 1, wherein separation markers of the first type comprise a predetermined number of successive black images or a predetermined number of successive white images.

13. The method according to claim 1 wherein images identified as separation markers are not stored, and wherein a first image immediately after each separation marker is the first image of an image sequence.

14. The method according to claim 1, further comprising calculating a moving mean value of the image brightnesses over a predetermined number of individual images and calculating the upper and lower threshold values from the moving mean value and a parameter for the response sensitivity of the separation markers of the first type, such that a white separation marker is set if a mean image brightness of a current image exceeds the upper threshold value, and a black separation marker is set if the mean image brightness of a current image is less than the lower threshold value.

15. The method according to claim 14, wherein mean image brightness values of images identified as separation markers do not enter into the moving mean value calculation.

16. The method according to claim 1, further comprising setting separation markers of the second type between a current and a preceding image by calculating a RMS deviation of a pixel brightness; determining a moving mean value of the RMS deviations over a predetermined number of preceding image changes; determining a second type threshold value from a parameter specifying the response sensitivity for separation markers of the second type; and setting a separation marker if the root mean square deviation of the change in image from the current and proceeding images exceeds the second type threshold value.

17. The method according to claim 16, wherein root mean square deviations of separation markers of the second type are used in calculating the moving mean value, but the RMS deviation of separation markers of the first type are not used in calculating the moving mean value.

18. The method according to claim 7, further comprising discarding all separation marker sequences with separation markers of the first type that contain less than the number of individual images which is necessary in order to set a separation marker of the first type, and discarding all separation markers of the second type which have fewer individual images between itself and a next separation marker of the first type than the minimum number of images of a sequence which is necessary in order to be terminated by separation markers of the second type.

19. The method according to claim 1, wherein a sequence starts with a starting image chosen from the group consisting of a first image of a file, a first image after a separation marker of the first type, and a separation marker of the second type; and ends with an ending image chosen from the group consisting of a last image of the file, a last image before a separation marker of the first type, if it acquires at least the number of individual images which is necessary in order to set a separation marker of the first type, and the last image before a separation marker of the second type, if it contains at least the minimum number of images of a sequence which is necessary in order to be terminated by separation markers of the second type.

20. The method according to claim 1, wherein a selected individual image of an individual sequence is displayed as an icon on a monitor, and wherein the individual sequence is started by clicking on the icon.

21. The method according to claim 20, wherein a sequence of individual sequences is started for viewing by clicking on a plurality of icons.

22. The method according to claim 1 for use in automatically separating digitized films into individual sequences.

23. The method according to claim 1 for use in automatically separating digitized cardiological films into individual sequences.

* * * * *